Oct. 24, 1950          C. R. PATON          2,527,487
AIR DUCT ARRANGEMENT FOR VEHICLE POWER PLANTS
Filed Feb. 2, 1949          8 Sheets-Sheet 1
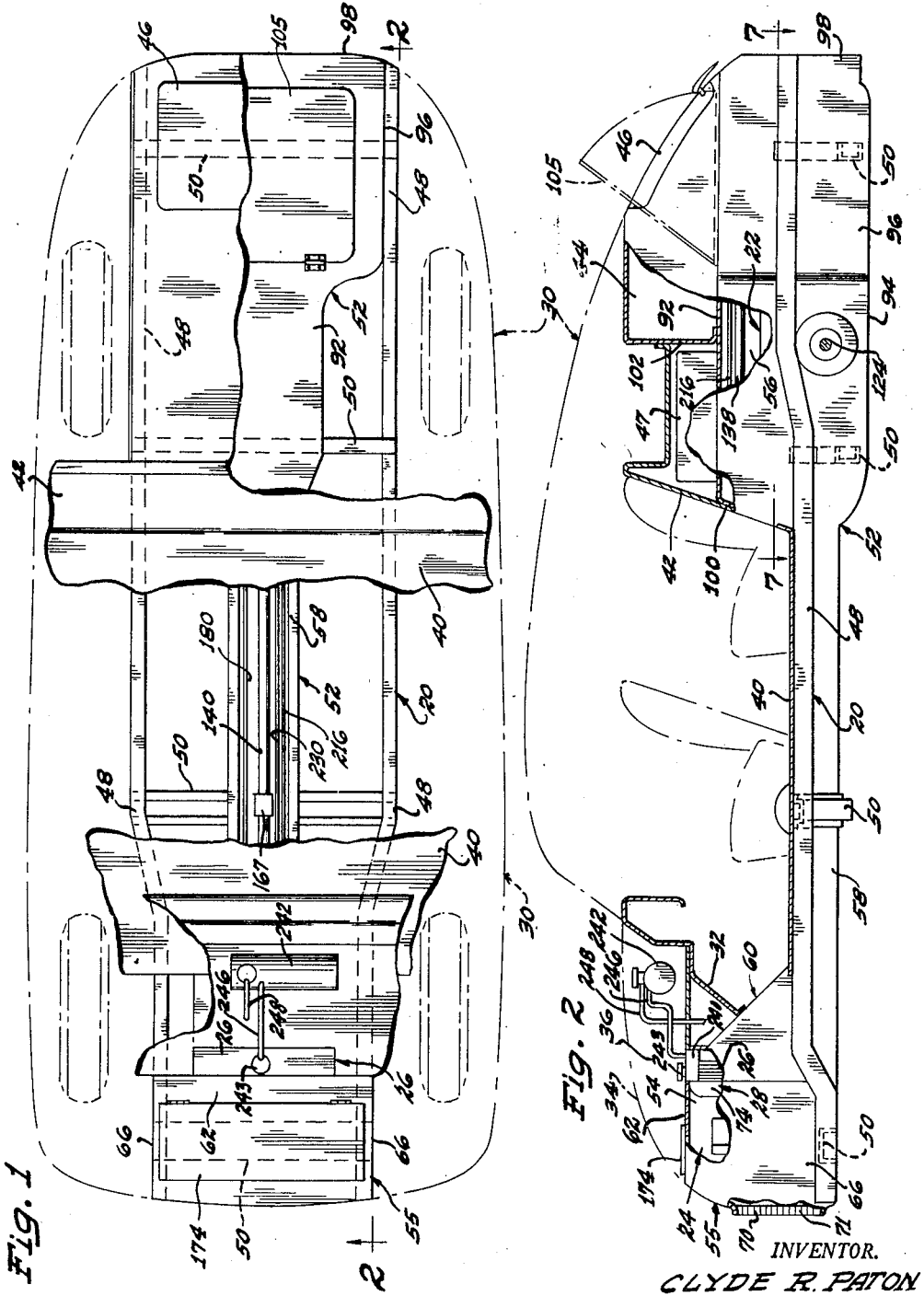
INVENTOR.
CLYDE R. PATON
BY
Wallace P. Lamb

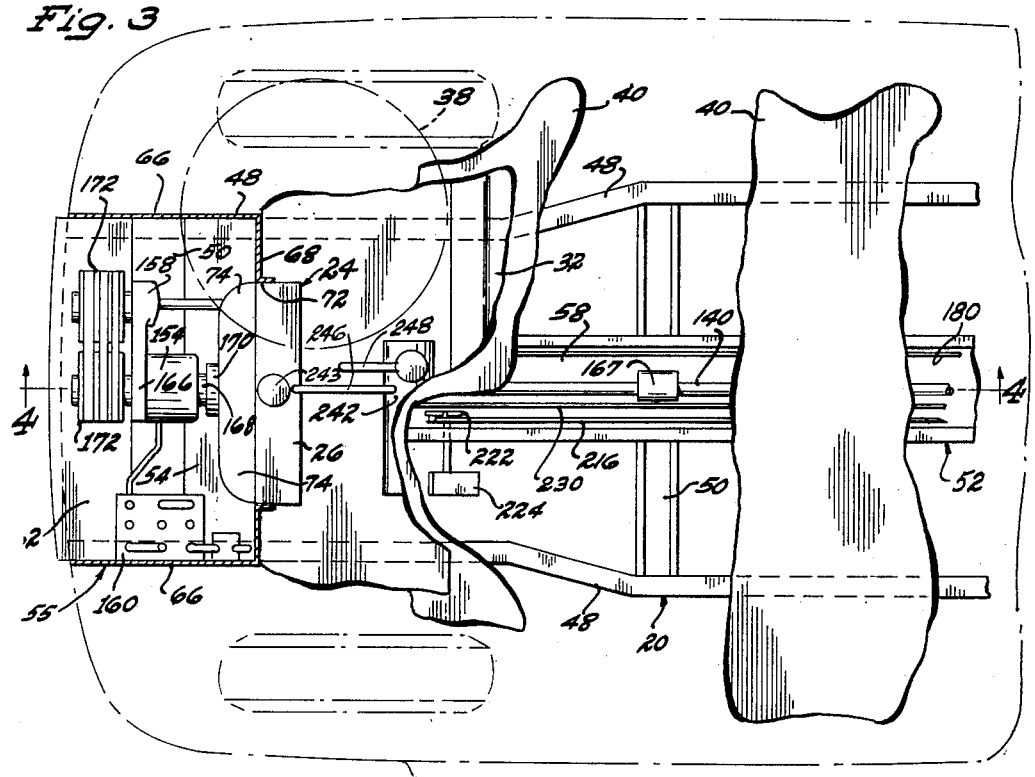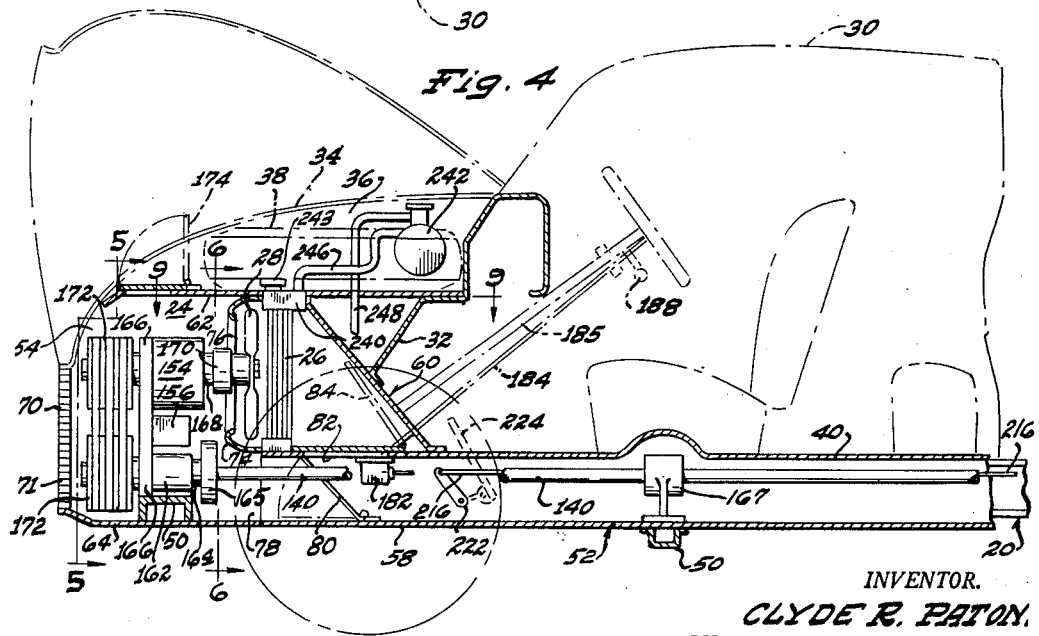

Oct. 24, 1950          C. R. PATON          2,527,487

AIR DUCT ARRANGEMENT FOR VEHICLE POWER PLANTS

Filed Feb. 2, 1949          8 Sheets-Sheet 4

INVENTOR.
CLYDE R. PATON
BY Wallace P. Lamb

Oct. 24, 1950   C. R. PATON   2,527,487
AIR DUCT ARRANGEMENT FOR VEHICLE POWER PLANTS
Filed Feb. 2, 1949   8 Sheets-Sheet 5
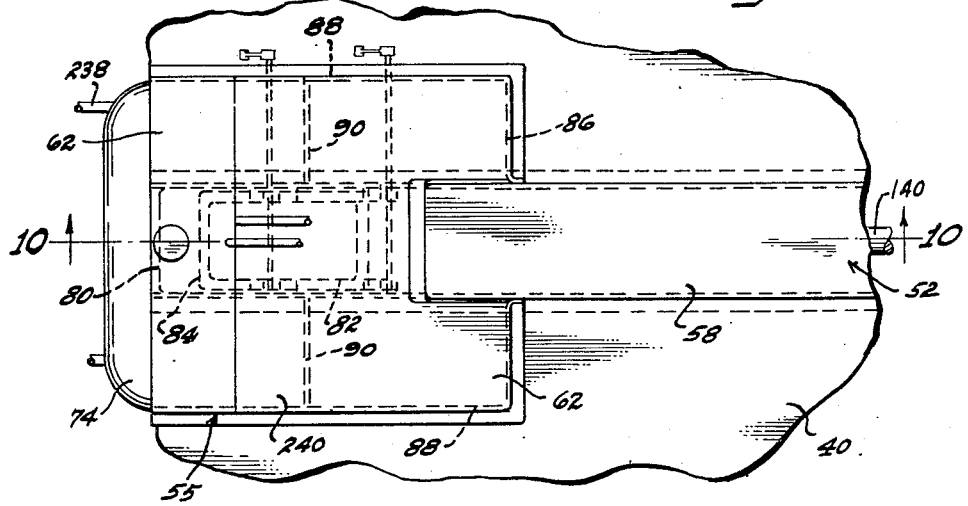
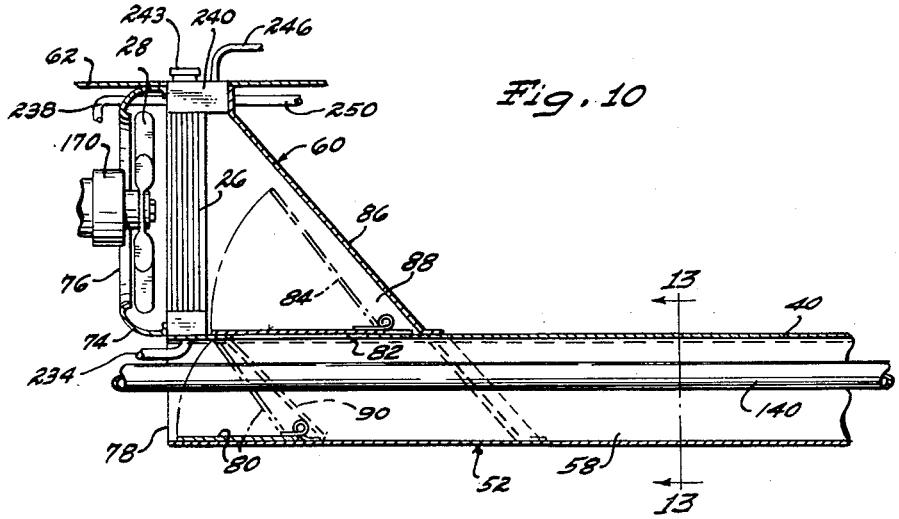
INVENTOR.
CLYDE R. PATON.
BY Wallace P. Lamb Oct. 24, 1950 — C. R. PATON — 2,527,487
AIR DUCT ARRANGEMENT FOR VEHICLE POWER PLANTS
Filed Feb. 2, 1949 — 8 Sheets-Sheet 6

INVENTOR.
CLYDE R. PATON
BY Wallace P. Lamb

Oct. 24, 1950          C. R. PATON          2,527,487
AIR DUCT ARRANGEMENT FOR VEHICLE POWER PLANTS
Filed Feb. 2, 1949          8 Sheets-Sheet 7
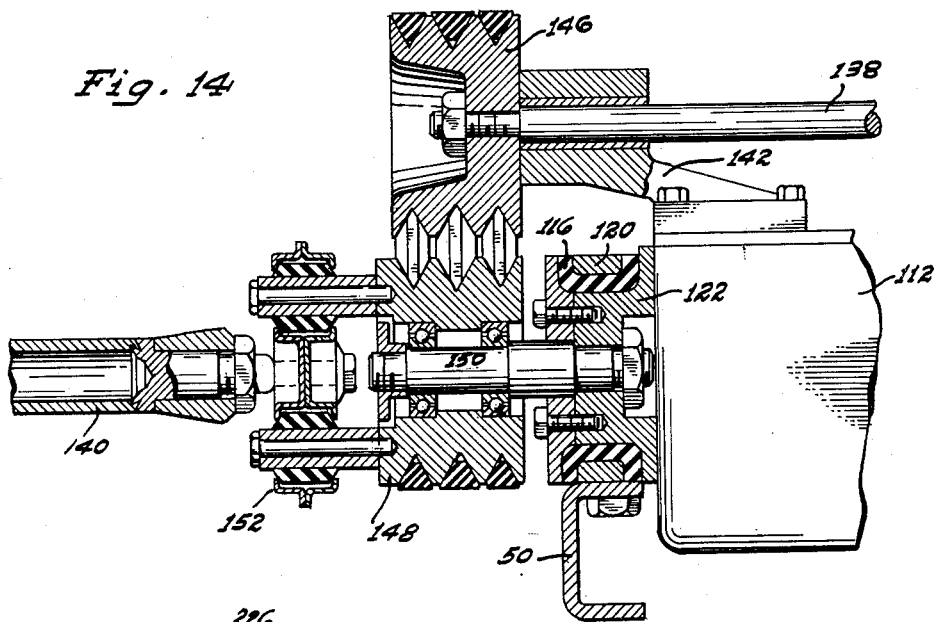
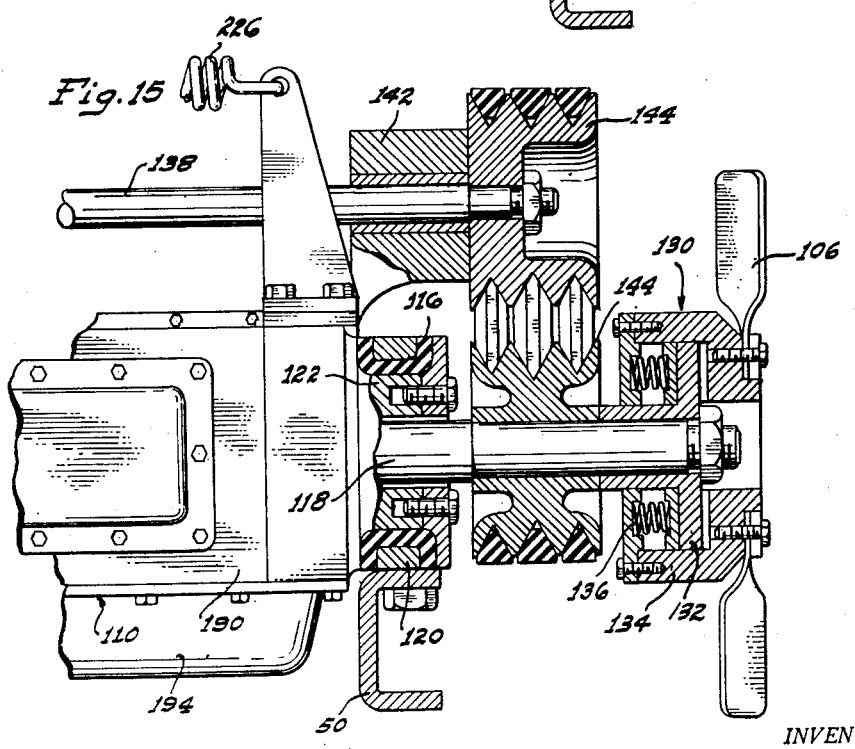
INVENTOR.
CLYDE R. PATON.
BY Wallace P. Lamb

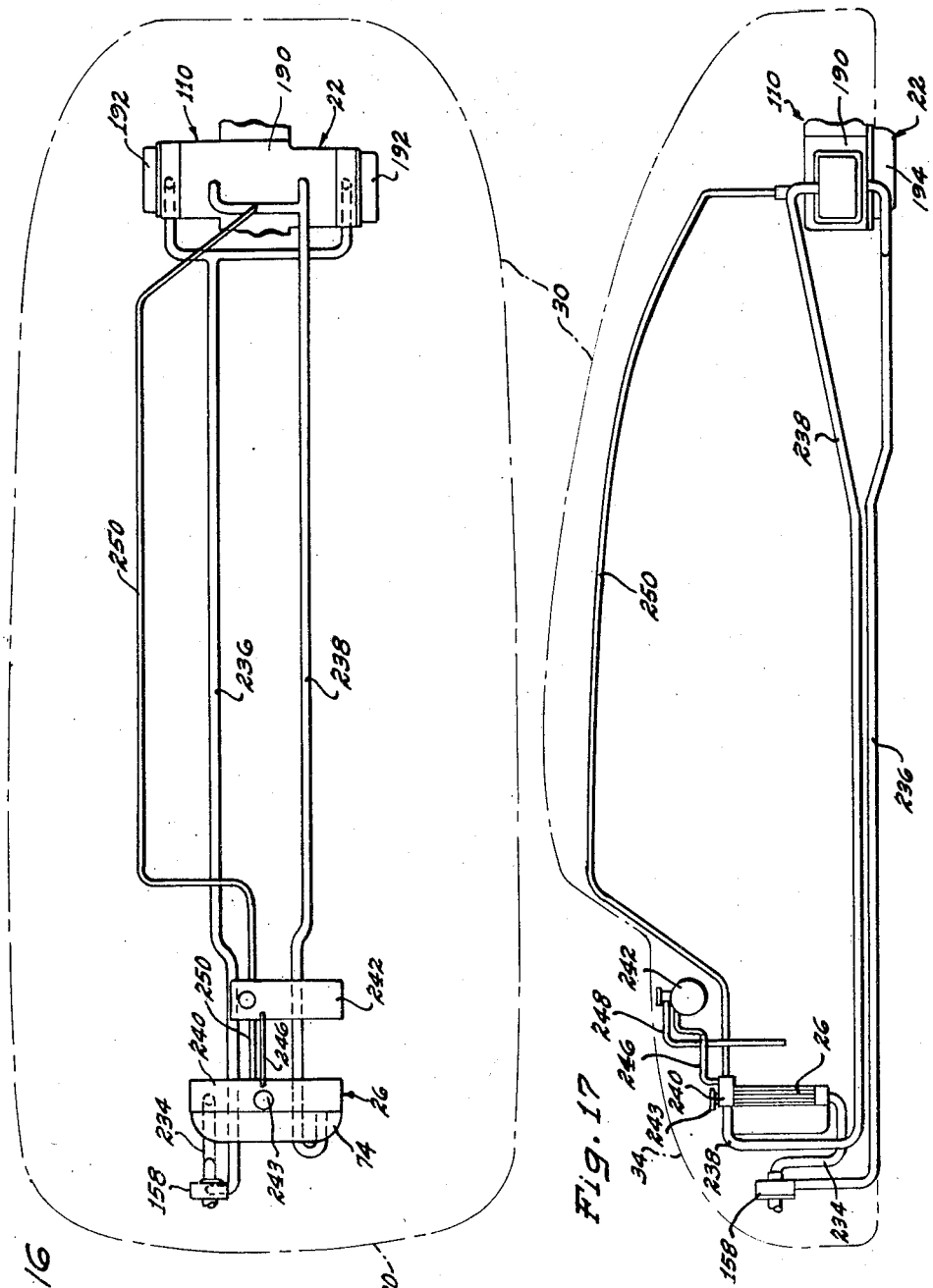

Patented Oct. 24, 1950

2,527,487

UNITED STATES PATENT OFFICE 2,527,487

AIR DUCT ARRANGEMENT FOR VEHICLE POWER PLANTS

Clyde R. Paton, Bloomfield Village, Mich.

Application February 2, 1949, Serial No. 74,051

13 Claims. (Cl. 180—54)

This invention relates generally to motor vehicles and more particularly to rear engine vehicles.

It is an object of the present invention to provide a rear engine vehicle having an improved arrangement of its power plant and of the power plant engine accessories in the interests of weight distribution and general balance of the vehicle without sacrificing air cooling and/or combustion efficiency of the engine.

Another object of the invention is to provide a motor vehicle having a rear power plant protected against dust and dirt in such a manner as to provide also for supplying of relatively clean air to the power plant both for combustion and temperature control purposes.

Another object of the invention is to provide in a motor vehicle having a rear power plant, and front engine accessories, an improved arrangement of control to power plant operating means; of an accessory drive mechanism; and of an engine air supply system for protecting the operating means and accessory drive mechanism against dust and wheel splash.

Another object of the invention is to provide in a rear power plant vehicle an air supply duct arranged to deliver clean air to the engine for combustion and temperature control purposes and also to function as a housing for the vehicle power plant and its engine accessories.

Another object of the invention resides in the arrangement of the above mentioned air delivery duct to function as a structural member of the vehicle frame and body and also as a partition of compartments in the body of the vehicle.

Another object of my invention is to provide an improved motor vehicle in which the power plant thereof is mounted at the rear of the vehicle for short driving connection to the vehicle rear wheels and at the same time is mounted to oscillate so as to absorb its operating vibrations while at the same time is sealed in the above mentioned air delivery duct.

Another object of the invention is to provide an improved vehicle engine cooling system for vehicles having a front radiator and a rear engine which system prevents sudden pressure decreases in the engine cooling jacket which tend to occur on rapid deceleration of the vehicle and/or when the vehicle descends a steep grade.

Other objects of the invention will become apparent from the following detailed description, taken in connection with the accompanying drawings in which;

Fig. 1 is a plan view of a motor vehicle having parts broken away to show certain features of my invention;

Fig. 2 is a side view of the vehicle partly broken away and in section, taken substantially along the line 2—2 of Fig. 1;

Fig. 3 is an enlarged, fragmentary plan view of a front end portion of the vehicle;

Fig. 4 is a vertical sectional view of a front end portion of the vehicle, taken substantially along the line 4—4 of Fig. 3;

Fig. 9 is a fragmentary, plan view of the vehicle, taken along the line 9—9 of Fig. 4;

Fig. 10 is a vertical sectional view of the vehicle, taken along the line 10—10 of Fig. 9;

Fig. 14 is an enlarged sectional view of the power plant driving mechanism, taken along the line 14—14 of Fig. 7;

Fig. 15 is an enlarged, sectional view of the power plant driving mechanism taken along the line 15—15 of Fig. 7;

Fig. 16 is a plan view of parts of the vehicle including a liquid, engine cooling system shown somewhat diagrammatically;

Fig. 17 is a side view of the vehicle parts shown in Fig. 16; and

Figure 5:
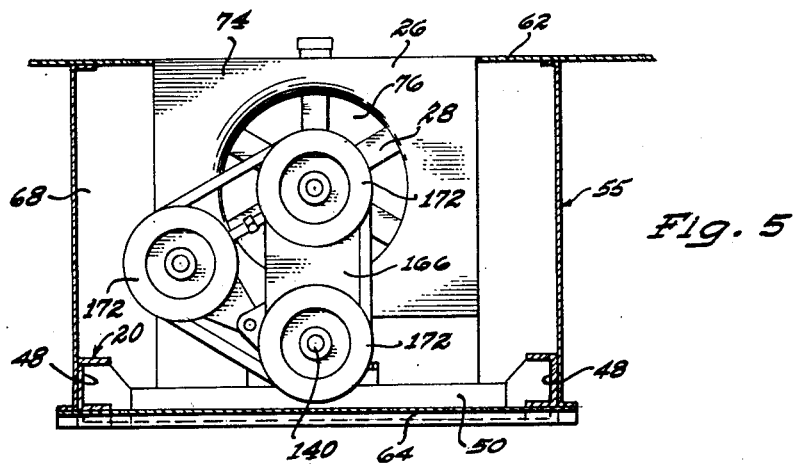
Fig. 5 is a vertical cross sectional view of the vehicle, taken along the line 5—5 of Fig. 4.

Referring to the drawings by characters of reference, the vehicle shown comprises, in general, a support or underbody frame 20, a power plant 22 and engine accessories 24, including a radiator 26 and a fan 28. The power plant 22 is mounted on the frame 20 adjacent the rear of the vehicle to acquire the advantages of a short driving connection with the vehicle rear wheels and the power plant accessories 24 are mounted on the frame 20 adjacent the vehicle front wheels in the interests of weight distribution or to balance partially, the weight of the power plant 22.

A body 30 of the passenger type may have a dash panel 32 from which a hood or bonnet 34 may extend forwardly to cover the engine accessories 24 and to cover also a storage or luggage compartment 36 above the engine accessories. Among other things, a spare tire 38 may be carried in the luggage compartment 36. Preferably, the body 30 is provided with a sheet metal floor pan 40 which may seat on and be welded or be otherwise secured to the supporting frame 20. Behind the vehicle rear seat, the floor pan 40 may be inclined upwardly and rearwardly to provide a rear seat back 42 and then may extend rearwardly from the seat back to form part of the top wall of a rear luggage compartment 44 above the power plant 22. A rear deck access opening to the luggage compartment 44 may be closed by a hinged door 46. If desired, a gasoline tank 47 may be arranged in the compartment 44, and gasoline may be delivered from this tank by gravity feed to the hereinafter described engine of the power plant 22. However, it is to be understood that a force feed fuel system may be used, if desired.

The frame 20 may be of any suitable type and construction, the instant frame comprising, a pair of laterally spaced side frame members 48, and spaced, connecting, or cross members 50. These frame members 48, 50 may be welded, bolted, or be otherwise suitably secured together in any manner so as to provide a rigid frame structure. Any of the well known suitable ground wheel suspension devices, (not shown), may be used to connect the front and rear wheels of the vehicle to the frame 20.

In accordance with my invention, I provide an air delivery duct and housing, designated generally by the numeral 52, which I arrange to house the power plant 22, engine accessories 24, and connections therebetween to insure supply of relatively clean air to the power plant for combustion and engine temperature control purposes; to protect the above units from inclement weather; and to protect controls and other power plant accessory connections from wheel splash which in winter may form ice and interfere with or render said controls inoperative. The duct means 52 is supported by the frame 20 and extends from front to rear of the vehicle between the frame side members 48.

Figure 6:
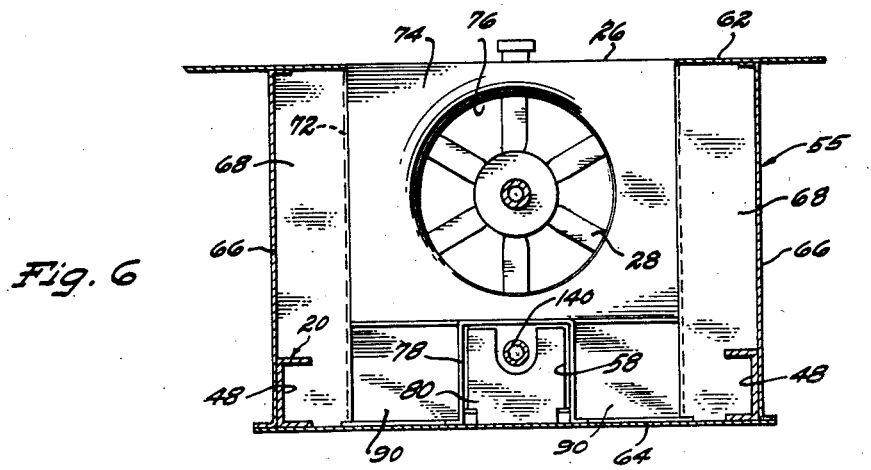
Fig. 6 is another vertical cross sectional view of the vehicle, taken along the line 6—6 of Fig. 4.

The duct means 52 comprises, a front engine accessories compartment 54, a rear power plant compartment 56, an intermediate connecting conduit and housing 58, and a radiator-fan housing or branch duct 60. The engine accessory compartment 54 is formed by a casing 55 which may be and preferably is made of sheet metal. Preferably, the casing 55 is made rectangular in cross section having a top wall 62, bottom wall 64, side walls 66 and a rear wall 68. An opening 70 in the front of the casing 55 serves as the air intake for the duct means and may be provided with a suitable grill 71. In the casing rear wall 68, adjacent the casing top, a flanged opening 72 leads into the branch duct 60 and receives the radiator 26, (see Fig. 3). As is shown more clearly in Fig. 6, the radiator 26 rests on the conduit 58 and may be welded thereto and to the casing rear wall flanges at the opening 72. Housing the fan 28 is a shroud 74 having an air intake 76 in the engine accessories compartment 54. This shroud 74 is provided so as to prevent recirculation of air in the compartment 54 by the fan.

At its front end, the conduit 58 is open, as at 78, providing an air intake in communication with the engine accessories compartment 54. This air intake 78 is preferably located immediately below the fan 28 and adjacent the bottom of compartment 54, as shown. The air delivery duct front end portion in the region of the radiator 26 may be and preferably is rectangular in cross section, as shown for example in Fig. 6. In this rectangular portion of the conduit, a damper 80 is provided adjacent the front end of the conduit to control air supply therethrough. In the top of the conduit 58, formed by the floor pan 40, a by-pass opening 82 connects the branch duct 60 with the main duct 58, rearwardly of and by-passing the damper 80. Air flow from the branch duct 60 may be controlled by a damper 84 which may overlie the opening 82 and may be hinged to swing upwardly therefrom to increase air flow from the fan into the main air duct 58. The dampers 80, 84 may be operated from the vehicle instrument panel by push-pull wires attached to buttons, (not shown), on the instrument panel, or by any other suitable means.

The branch air duct 60 has a rear wall 86 and opposite side walls 88. Extending substantially from the top of the radiator 26, the branch duct rear wall 86 is inclined rearwardly and downwardly therefrom so as to function as a baffle to direct air from the radiator 26 downwardly and to discharge air beneath the vehicle and/or to discharge air into the conduit 58, depending upon the position of the damper 84. As shown, in Figs. 9 and 10, the inclined air baffle or wall 86 may be flanged and the flanges welded or otherwise secured to the main duct conduit 58. On opposite sides of the conduit 58 and adjacent the radiator 26, portions of the floor pan 40 are bent down to provide rearwardly inclined, fixed air baffles 90. It will be understood that when the dampers 80 and 84 are in closed positions, air entering the engine accessories compartment 54 will pass over the radiator and then flow downwardly around opposite sides of the duct 58 and out beneath the vehicle. If damper 80 is moved to an open position, some air will flow directly from the engine accessories compartment 54 into the conduit 58 and mix with heated air entering the duct from the radiator 26. Thus, it will be seen that the temperature of the air delivered to the power plant compartment 56 and consequently the temperature of the engine therein may be controlled, as desired, by adjustment of the dampers 80 and 84. In winter, combustion and engine operation may be aided when first starting the engine by arranging the dampers 80, 84 so that air heated by the radiator is delivered to the power plant compartment 56. To this end, the damper 84 may be moved to fully open position and damper 80 to closed or partially open position, as may be desired.

Figure 8:
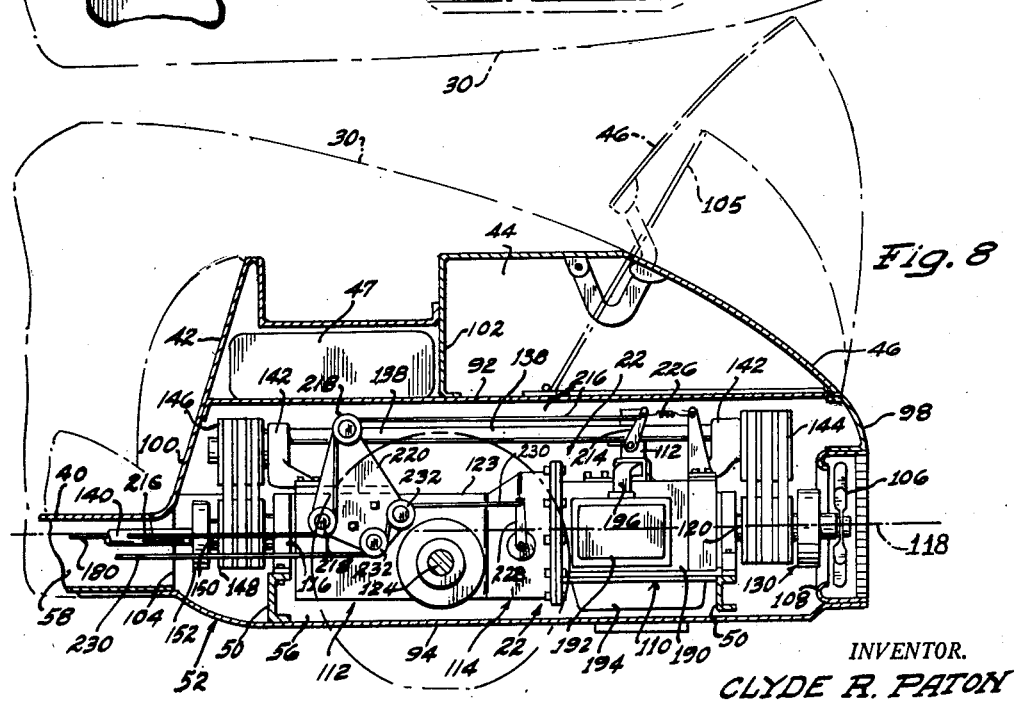
Fig. 8 is an enlarged, vertical sectional view of a rear end portion of the vehicle, taken substantially along the line 8—8 of Fig. 7.

The power plant compartment 56 is formed by a casing which is preferably made of sheet metal having a top wall 92, a bottom wall 94, side walls 96, rear wall 98, and a front wall 100. The top wall 92 of the power plant compartment 56 is the bottom wall of the gasoline tank compartment and of the luggage compartment 44. A vertical partition 102 separates the gasoline tank compartment from the luggage compartment 44. As shown in Fig. 8, the casing front wall 100 is formed by the rear seat back 42. Below the rear seat, an air inlet 104 is provided for compartment 56 to which is connected the rear end of the air delivery conduit 58. In the power plant compartment top wall 92, an access opening is provided which is normally closed by a hinged door 105. As shown in Figs. 2 and 8, I have arranged the door 105 so that it can be swung upwardly through the rear deck door opening thus giving access to the power plant compartment through the rear deck door opening. An exhaust ventilating fan 106 is provided at the rear of the compartment 56 principally to insure ventilation of the duct means when the vehicle is at rear and its engine is idling. This ventilating fan 106 is preferably provided with a shroud 108 which may be secured in and to an opening provided in the casing rear wall 98. Preferably, the fan 106 is arranged substantially in alignment with the casing inlet 104.

The power plant 22 comprises, in general, an engine 110, a speed change mechanism or transmission 112, and a clutch mechanism 114. These power plant units are arranged in line within and longitudinally of the compartment 56. The engine 110 is arranged rearwardly of the transmission 112, and the clutch is arranged intermediate the transmission and engine. To decrease transmission of engine created vibrations to the vehicle frame and body, I mount the power plant at opposite ends thereof in rubber mountings 116. These mountings 116 are of a character and arrangement to allow limited oscillation of the power plant about a longitudinal axis. This axis of oscillation preferably extends substantially through the center of gravity of the power plant mass and is preferably common to the axis of the engine crackshaft, designated by the numeral 118. Split, mounting supports 120 may be provided and be rigidly secured to the frame cross members 50 to support the rubber mountings 116. These mounting members 120 clamp the rubber mountings circumferentially to trunnions 122 which may be integral respectively with the transmission and engine housings.

A differential gear mechanism 123 is housed in the power plant housing between the transmission 112 and the clutch 114. Operatively connected to the differential gear mechanism are individual rear axles 124 which extend from opposite sides of the power plant housing through openings 126 in opposite sides 96 of the power plant compartment casing. To seal the power plant compartment 56 at the axle openings therein without appreciably resisting oscillation of the power plant, I provide flexible sealing members or bellows 128. Surrounding the axles 124, outer ends of the bellows 128 are secured and sealed to the inner surfaces of the casing side walls 96, and the inner ends of the bellows are secured and sealed to outer side surfaces of the power plant casing.

As shown in Fig. 15, the engine crank shaft 118 extends rearwardly beyond the rear mounting 116 to drive the exhaust or ventilating fan 106. A torsion dampening coupling 130 is provided in the power plant compartment 56 and is arranged to couple the crankshaft 118 to the fan shaft to dampen torsional vibrations of both shafts. The coupling 130 may comprise a driving disk 132 on, and driven with, the crankshaft 118 within a large hub 134 of the fan 106. The driving disk 132 may be splined to the crankshaft 118. A plurality of compressed helical coil springs 136 are disposed within the fan hub 134 and act to hold the hub yieldingly in frictional driving engagement with the driving disk 132.

In order to drive the engine accessories 24 from the engine crankshaft 118, I provide articulated shaft means comprising, a rear shaft 138 and a front shaft 140. The rear shaft 138 is disposed within the power plant compartment 56 and is axially offset from the front shaft 140 in order to connect the engine crankshaft and the front accessory drive shaft. To this end, the rear shaft 138 may be arranged above and parallel to the axis of the crankshaft 118. Longitudinally spaced, mounting supports or brackets 142 may be provided for rotatably supporting the rear shaft 138. The brackets 142 are respectively carried by and rigidly secured to the transmission housing and to the engine crankcase. Drivingly connecting the engine crankshaft 118 and the shaft 138 is a pair of multi-belt driving pulleys 144 respectively fixed to the shafts. Fixed to the shaft 138 adjacent the front end thereof, a multi-belt driving pulley 146 drives a similar pulley 148 which is journalled on a stub shaft 150 in axial alignment with the shaft 140. The stub shaft 150 is carried by and extends forwardly of the power plant front trunnion 122. Connecting the pulley 148 to the adjacent end of the shaft 140 is a torsion dampening universal coupling, designated generally by the numeral 152. From the coupling 152 the shaft 140 extends through and is housed in the duct or conduit 58, protected therein against inclement weather and against wheel splash.

The engine accessories include, a generator 154, an engine starter 156, a water pump 158, and a storage battery 160. In the engine accessories compartment 54, a support which may be a casting has a shaft bearing support 162 in which a rotatable shaft 164 is journalled substantially in axial alignment with the shaft 140. These shafts 140, 164 are coupled together by a torsion dampening, universal coupling 165 which may be like, or similar to, the rear coupling 152. An intermediate bearing 167 is preferably provided for the shaft 140 and may be mounted on and may be rigidly secured to one of the frame cross members 50.

Extending upwardly from the mounting 162, the casting includes a gear casing 166 wherein gears (not shown), operatively connect the shaft 164 to the generator 154, starter 156, and to the water pump 158. A shaft 168, extending rearwardly from the generator 154, drives the radiator fan shaft through a coupling 170. Forwardly of the engine accessories, multi-belt driven pulleys 172 are fixed respectively on the shafts of the generator 154, pump 158, and the shaft 164; thus drivingly connecting these units. In the top wall 62 of the engine accessories compartment 54, an access opening is provided for access to the engine accessories, and this opening may be normally closed by a hinged door 174.

Figure 7:
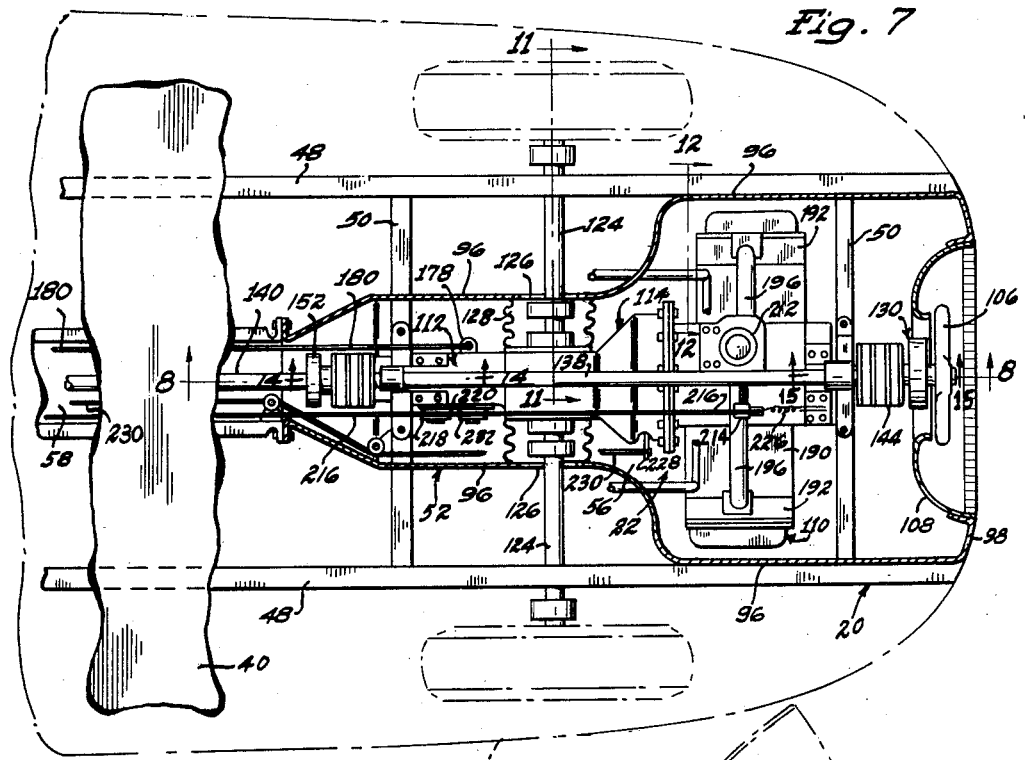
Fig. 7 is an enlarged, horizontal sectional view of a rear end portion of the vehicle.

The transmission 112 may be of the so-called automatic shift type which, as is well known, shifts in response to changing speeds through a series of different gear ratios from low to high speed. Low speed and/or reverse gear may be manually selective by operation of a shifter lever 178 which may be disposed at one side of the transmission housing and may be connected to the shifter through an opening in the housing wall (see Fig. 7). This shifter lever 178 is connected to one end of a flexible link or cable 180 which I arrange to extend forwardly through the conduit 58 so as to be protected thereby from inclement weather and from wheel splash. Adjacent the front end of the conduit 58, the cable 180 may extend around a pair of pulleys (not shown), in a casing 182. One of the pulleys may be fixed to a rotatable shaft 184 extending along and adjacent a steering column 185. On the upper end of the shaft 184, adjacent the steering wheel of the vehicle, the conventional, manually operable shift lever 188 may be provided and may be fixed to the shaft 184. Thus, by means of the manual shift lever 184 low and/or reverse gears may be selected, as desired.

In the present disclosure, the engine 110 is of the so-called opposed cylinder type having a cylinder block 190, cylinder heads 192, and an oil pan 194. Other types of internal combustion engines may be used in the vehicle, but I consider the opposed cylinder engine shown most desirable. Among other reasons, opposed cylinder engines can be arranged as shown so as to extend longitudinally crosswise of the vehicle in the interests of space saving and can be easily balanced on its yieldable mountings to oscillate in a manner to absorb most, if not all, of its own vibrations. An intake manifold 196 is provided for the engine extending thereabove and longitudinally of the engine communicates with the opposite cylinder heads 192. Each of the cylinder heads 192 is also provided with an exhaust manifold 198 from each of which extends an exhaust pipe 200. As shown, the exhaust pipes extend externally of the power plant compartment 56 and may be arranged to discharge rearwardly of the adjacent rear ground wheels. Also, externally of the power plant compartment 56, each of the exhaust pipes 200 may be provided with a muffler 202.

Figures 11, 12:
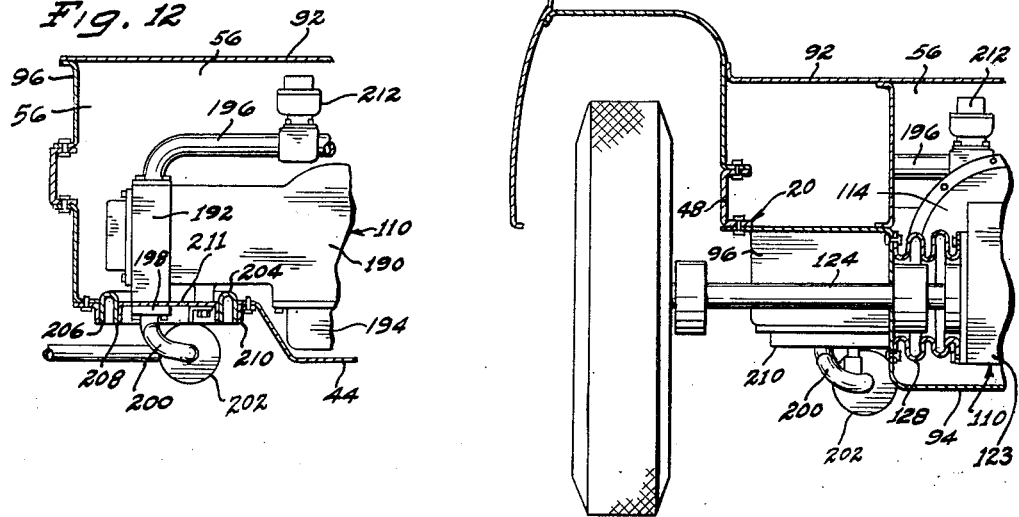
Fig. 11 is a vertical cross sectional view of the vehicle, taken along the line 11—11 of Fig. 7.
Fig. 12 is a vertical cross sectional view of the vehicle, taken along the line 12—12 of Fig. 7.
Figure 13:
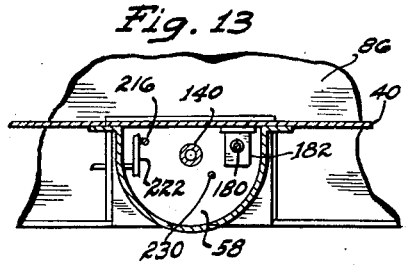
Fig. 13 is a vertical cross sectional view of the vehicle, taken along the line 13—13 of Fig. 10.

In order that engine exhaust may be discharged externally of the power plant compartment, and at the same time have the exhaust pipes oscillate with the power plant, I provide a seal in the form of a diaphragm 204 between each engine head and the compartment casing bottom wall 44 (see Fig. 12). The diaphragm 204 may be made of rubber or a heat resisting fabric in general tubular form having an outer and fixed end portion 206 and an inner, movable end portion 208 concentric therewith. An aperture in the casing bottom wall 44 is extended downwardly by a flanged ring 210 to the inner surface of which the diaphragm end portion 206 is sealed and secured. The diaphragm 204 may be secured to the inner surface of the ring 210 by bonding it thereto or by any other suitable securing means. The inner end portion 208 of the diaphragm is bonded or otherwise sealed and secured to the periphery of a movable plate 211 which closes the movable end of the diaphragm. This plate 211 is rigidly clamped to the underside of the engine head, such as by bolts, so that the plate moves with the oscillatory power plant. Thus, it will be seen that the power plant and the exhaust pipes oscillate together; the engine exhausting externally of the power plant casing without breaking the seal of its compartment or air duct.

Connected in the intake manifold 196, within the power plant compartment 56, is a carburetor 212 in the path of the clean air which passes through the duct means. A throttle valve operating lever 214 of the carburetor 212 is connected to one end of a cable 216 which extends over guide pulleys 218 mounted on a bracket 220 which is secured to one side of the transmission casing. From the pulleys, the cable 216 extends into and through the air delivery conduit 58 for connection to a lever 222 which is operated by a foot throttle 224 conveniently placed for the operator or driver of the vehicle. A helical coil spring 226 may be provided to return the throttle valve of the carburetor 212 to or toward closed throttle position. As shown, the lever 22 is pivoted and arranged within the conduit 58 so as to be protected thereby from inclement weather and splash of water which otherwise might freeze on the lever and prevent its operation.

At one side of the clutch housing, externally thereof, a clutch operating lever 228 is connected to a clutch pedal, (not shown), by a cable 230. This cable 230, like the engine accessories drive shaft 140 and like the previously described cables, extends through the air duct means for protection against the weather and wheel splash. As shown in Fig. 8, the cable 230 extends forwardly over guide pulleys 232 which are mounted on the pulley bracket 220 and is connected adjacent the front end of the conduit 58 to a clutch pedal, (not shown).

Figure 18:
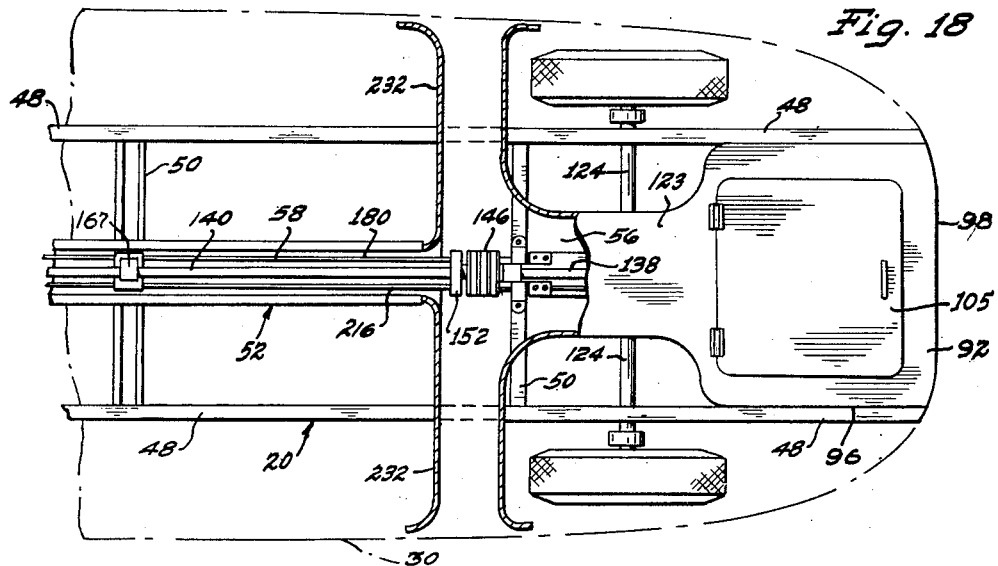
Fig. 18 is a view similar to Fig. 7 showing a modification of the invention.

In Fig. 18, I have shown a modification of my rear engine vehicle which is similar to the above described vehicle so that like parts are designated by like numerals. The modification differs from the preferred form of the invention in the provision of opposite and laterally extending air intake conduits 232 located just rearwardly of the back seat. The conduits 232 preferably have intakes at the sides of the vehicle body above and forwardly of the rear ground wheels of the vehicle. Suitable grills, (not shown), may be provided for the air intake ducts at the sides of the body. Also suitable dampers, (not shown), may be provided in the ducts 232 and be controlled from the instrument panel by push-pull wires or by other suitable means.

In Figs. 16 and 17, I have shown somewhat diagrammatically an engine water cooling system in which certain objections due to the long distance between the radiator 26 and the engine 110 have been overcome. The water cooling system is a so-called closed system which includes the engine water jacket, the radiator 26, and the water pump 158. A conduit or pipe 234 connects the bottom tank of the radiator 26 to the intake of the pump 158, and from the outlet of the pump a pipe 236 leads to the water jacket of the engine. From the outlet of the engine water jacket, a return pipe 238 leads to the header, as at 240, of the radiator 26. The present water cooling system is of the type which is completely filled with a liquid or water, and to this end I provide an expansion tank 242. This tank 242 may be located in the front storage compartment 36, above the radiator and pump. A filler cap 243 on the radiator header 240 is without the usual vent hole. A conduit 246 connects the radiator 240 at the top thereof to the top of the expansion tank 242, above the normal level of water therein. A conduit 248 connected above conduit 246 to the expansion tank 242 is provided for overflow and pressure relief.

In motor vehicles where the engine and radiator are spaced far apart as in the present vehicle, the provision of the expansion tank prevents loss of the coolant or water upon rapid deceleration of the vehicle, or when the vehicle is descending severe down grades. Also, sudden deceleration of the vehicle or the encountering of severe down grades causes a sudden pressure reduction in the engine cylinder jackets because the long connecting lines involve a substantial inertia. This sudden reduction in pressure in the engine water jackets tends to trap steam therein which is, of course, objectionable. To overcome the above objections, I provide a pressure relief conduit 250 which connects the high point of the engine jacket to the radiator header 240. As illustrated in Fig. 17, the pressure relief conduit 250 may extend from the engine water jacket forwardly along the vehicle body roof rail and down the front door pillar to the radiator header.

From the foregoing description, it will be noted that I have provided an improved motor vehicle of the rear power plant type in which engine accessories are located adjacent the forward end of the vehicle to balance partially the weight of the rear power plant. It will also be noted that I have provided a front to rear air delivery duct means encasing the accessories, power plant, and interconnections therebetween whereby to protect them against inclement weather and against wheel splash while at the same time supplying clear air to the power plant for temperature control and combustion purposes. Furthermore, I have provided a rear engine in a sealed compartment in such a manner that the engine and its exhaust outlets may oscillate to decrease vibration while at the same time exhausting externally of the compartment. In addition, I have provided for the above vehicle, an improved liquid coolant system of a character such that extreme pressures will not develop in the system, such as when the vehicle is rapidly decelerating, or will steam be trapped in the engine cooling jackets.

While I have shown and described my invention in detail, it is to be understood that the invention is to be limited only by the spirit and scope of the appended claims.

1. In a motor vehicle having a front end and a rear end, a front ground wheel and a rear ground wheel, supporting means carried by said front and rear ground wheels, an engine supported by said supporting means adjacent said rear ground wheel and being connected to drive at least one of said wheels, means forming a compartment enclosing said engine having an air outlet, an air delivery conduit connected to said compartment having an air intake forwardly of said rear wheel, engine driven accessories carried by said supporting means adjacent said front wheel, and a drive shaft connecting said engine and said accessories disposed in and extending through said conduit.

2. In a motor vehicle, front and rear ground wheels, a longitudinally extending air delivery duct carried by said ground wheels having a forwardly disposed air intake and a rearwardly disposed air outlet, an engine mounted within said air delivery duct adjacent the said rear ground wheel, driving means operatively connecting said engine and at least one of said wheels, engine accessories disposed adjacent said front ground wheels within and adjacent the front end of said duct, an engine driven shaft extending forwardly of said engine within said duct and being operatively connected to said engine accessories, and said engine accessories including a fan driven by said shaft arranged to propel air through said duct to said engine.

3. In a motor vehicle having a front ground wheel and a rear ground wheel, supporting means carried by said wheels, an engine supported by said supporting means adjacent said rear wheel, means forming a compartment enclosing said engine, said compartment having an air inlet and an air outlet, a conduit extending from said air inlet forwardly having an air intake adjacent said front wheel, a damper in said conduit controlling flow therethrough, a second air intake into said conduit adjacent said front wheel, a fan at said second intake for delivering air through said conduit to said engine, and an engine driven shaft in said conduit operatively connected to and for driving said fan.

4. In a motor vehicle having a front wheel and a rear wheel, supporting means carried by said wheels, a power transmission mechanism supported by said supporting means adjacent said rear wheel, means forming a compartment enclosing said transmission mechanism having an air intake adjacent said front wheel, a laterally disposed opening in said compartment forming means, a shaft extending through said opening operatively connecting said transmission mechanism and said rear wheel, resilient mountings interposed between said transmission mechanism and said supporting means, and a flexible closure member surrounding said shaft having one end closing said opening and having the other end attached to said transmission mechanism.

5. In a motor vehicle having a front wheel and a rear wheel, supporting means carried by said wheels, a casing supported by said supporting means adjacent said rear wheel, said casing having an air inlet forwardly of said rear wheel and having an air outlet rearwardly thereof, an opening in a wall of said casing, an oscillating engine mounted in said casing having an exhaust extending outwardly thereof through said opening, and a flexible closure surrounding said exhaust and closing said opening therearound in said casing.

6. In a motor vehicle having front and rear ends, supporting means, an air duct extending longitudinally between said front and rear ends supported by said supporting means, an oscillatory power plant including an engine and a power transmission means disposed within said duct adjacent said rear end, engine accessories disposed adjacent said front end and carried by said supporting means, an engine driven shaft within said air duct in laterally spaced relationship to the axis of oscillation of said power plant, and an accessory driving shaft in substantially axial alignment with the axis of oscillation of said power plant and operatively connected to said engine driven shaft.

7. In a motor vehicle, front and rear ground wheels, supporting means carried by said front and rear ground wheels, an air delivery duct supported by said supporting means extending longitudinally between said front and rear ground wheels having a forwardly disposed air intake and a rearwardly disposed air outlet, an oscillatory engine mounted within said air duct adjacent said rear wheels having a rearwardly extending engine accessory drive shaft, resilient mountings interposed between said engine and said supporting means, an engine accessory supported by said supporting means adjacent said front ground wheels, a shaft mounted on said engine in oppositely disposed substantially parallel relationship to said accessory drive shaft, a shaft coaxially aligned with the axis of oscillation of said engine and extending within said duct forwardly of said engine for operative connection with said engine accessory, and belt drives connecting said shafts and connecting said last-named shaft and said engine accessory.

8. In a motor vehicle, a chassis frame supported by front and rear ground wheels, an engine supported by said frame adjacent the rear end thereof, engine accessories supported by said frame adjacent the front end thereof, driving means between and operatively connecting said engine and said engine accessories, a casing carried by said frame enclosing said engine adjacent the rear end of said frame, said casing having an air outlet, an air delivery conduit carried by said frame, said conduit having an air intake adjacent the front of said frame and having a rear end connected to said casing in communication therewith, and an accessory drive shaft extending longitudinally within said conduit connecting the engine to said accessories.

9. In a motor vehicle, having a supporting frame and a body carried thereby having a rear end portion, an engine casing secured to the frame beneath said body rear end portion having an inclined front wall forming a seat back and having a portion extending below the seat back, an air inlet in said portion of the inclined front wall below the seat back, said casing having a rear wall, an air outlet in said rear wall, a wall forming the bottom of a luggage compartment and the top wall of said casing, and side walls of said casing having openings for ground wheel driving connections to pass therethrough and having other openings for air inlets to said casing.

10. In a motor vehicle having a rear power plant and front engine accessories respectively at opposite ends of a vehicle body, duct means to extend beneath the body longitudinally thereof comprising, a front engine accessories casing having an air inlet, a rear power plant casing having an air outlet, an intermediate conduit connecting said casings, a damper in said conduit adjacent said engine accessories casing to control air delivery to said power plant casing, a fan-radiator conduit connecting said engine accessories casing to said first conduit around said damper, and a damper controlling flow through said fan-radiator conduit.

11. In a motor vehicle, air flow duct means comprising, an engine accessory compartment having an air inlet and having air outlets, an engine compartment, a conduit connecting one of said outlets to said engine compartment, an engine cooling system radiator mounted in the other of said engine accessory compartment outlets, a fan in advance of said radiator within said engine accessory compartment, a branch duct connecting the rear side of said radiator to said conduit, an outlet to atmosphere from said branch duct, and means controlling flow of air through said branch duct into said conduit and to atmosphere.

12. In a motor vehicle, supporting means having front and rear ends, an engine supported by said supporting means closer to said rear end than to said front end, means forming a compartment enclosing said engine, an air outlet in said means for said compartment, an air delivery conduit communicating with said compartment, an air intake in said air delivery conduit closer to said front end than said rear end, engine driven accessories carried by said supporting means closer to said front end than to said rear end, and means operatively connecting said engine and said accessories disposed within said air delivery conduit.

13. In a motor vehicle, a rear ground wheel, supporting means having front and rear ends, an engine-power transmission unit supported by said supporting means closer to the rear end than the front end thereof, means forming a compartment enclosing said engine-power transmission unit, said means having an air intake for said compartment closer to said front end of the supporting means than to the rear end thereof, a laterally disposed opening in said compartment forming means, a shaft extending through said opening operatively connecting the power transmission of said unit to said rear ground wheel, resilient mounting interposed between said engine-power transmission unit and said supporting member mounting said unit for oscillatory movement about an axis longitudinally of said supporting means, and a yieldable closure member surrounding said shaft having one end closing said opening and having the other end attached to said engine-power transmission unit.

CLYDE R. PATON.

REFERENCES CITED

The following references are of record in the file of this patent:

UNITED STATES PATENTS

| Number | Name | Date |
| --- | --- | --- |
| 940,031 | Krotz | Nov. 16, 1909 |
| 1,979,191 | Burney | Oct. 30, 1934 |
| 2,075,085 | Paton | Mar. 30, 1937 |
| 2,241,037 | Klavik | May 6, 1941 |
| 2,247,742 | Best | July 1, 1941 |

FOREIGN PATENTS

| Number | Country | Date |
| --- | --- | --- |
| 364,276 | Germany | Nov. 20, 1922 |
| 148,023 | Austria | Dec. 10, 1936 |
| 872,770 | France | Feb. 23, 1942 |
| 53,552 | The Netherlands | Nov. 17, 1942 |